Patented Mar. 21, 1933

1,902,515

UNITED STATES PATENT OFFICE

ROBERT MULLER, OF PIRNA-COPITZ, GERMANY, ASSIGNOR TO CHEMISCHE FABRIK POTT & CO., OF DRESDEN, GERMANY

PROCESS FOR PRODUCING WATER-SOLUBLE CONDENSATION PRODUCTS AND THE PRODUCTS PRODUCED

No Drawing. Application filed November 25, 1929, Serial No. 409,746, and in Germany November 27, 1928.

This invention relates to a process for producing water-soluble condensation products having capillaractive properties and more particularly to a process of preparing condensation products by the condensation of nitrogen-containing aromatic compounds with an alcohol having more than two carbon atoms and to the condensation products so produced.

Water-soluble condensation products having emulsifying, wetting, or froth-forming properties, or having in general the property of reducing the surface tension of aqueous solutions have heretofore been prepared by condensing aromatic sulphonic acids with alcohols having three or more carbon atoms to the molecule. Such condensation products are of great technical importance in the textile, paper, leather and other industries as emulsifying, cleansing, solubilizing, wetting agents and agents for other similar purposes.

I have now found that substances having properties similar to the properties of the alkylated aromatic sulphonic acids, or even having superior properties, may be obtained by condensing various nitrogen-containing aromatic compounds, other than aromatic sulphonic acids, with alcohols having three or more carbon atoms. The alcohols found to be suitable for use in the condensation step are preferably those higher than ethyl alcohol in the paraffin series, such as propyl and butyl alcohol.

It is therefore an important object of this invention to provide an improved process for obtaining water-soluble condensation products of this type having the above enumerated properties.

Other and further important objects of this invention will become apparent from the following description and appended claims.

The starting materials for condensation with the higher alcohols are in general nitrogen-containing aromatic compounds.

Some primary, secondary, or tertiary aromatic amines which by themselves are not water-soluble, but which are soluble in acid media in the form of their salts, may lead to technically valuable capillaractive substances when condensed with higher alcohols.

If tertiary aromatic amines, for instance dimethyl-naphthylamine be converted first by means of dimethyl sulfate into trimethyl-naphthyl-ammonium-methyl-sulfate, and then condensed with isopropyl alcohol in the presence of sulfuric acid as condensing agent to give trimethyl-isopropyl-naphthyl-ammonium-methyl-sulfate, alkylated quaternary bases are obtained, which are soluble in neutral as well as alkaline or acid aqueous liquids and which possess surprisingly high capillaractive properties.

Likewise, aromatic substances which are soluble in alkaline solutions because of their negative substituents, such as carboxyl, hydroxyl, sulfamine, nitro, or similar groups, may be converted by condensation with a higher alcohol, such as propyl or butyl alcohol, into alkali soluble condensation products having valuable wetting out properties suitable for use, for instance, in mercerizing lyes, in strongly alkaline vats, and the like.

The novel products of my invention are suitable for a long series of technical applications. They possess especially valuable properties when used as foaming, wetting, washing or similar agents, as in the various branches of the textile and dyeing industries. In general, these substances have the property of lowering the surface tension of aqueous solutions. It is possible with the aid of these substances of my invention to dissolve liquid or solid substances which are by themselves insoluble in water, or at least convert them into very fine, stable dispersions. Among the solid substances that may be so treated are those that are capable of melting or softening, such as hydrocarbons, higher alcohols, fats, oils, waxes, gums, pitch and pitch-like materials.

Additional properties of the products of my invention include their tanning action on animal skin, their heightening of the absorptivity of paper, paste board, or textile material impregnated with them, their acceleration of the speed of filtration of various suspensions of solid bodies, such as lacquers and the like. These new substances may further be used as foam makers in fire extinguishers, as disinfectants, as pest destroying agents, as bactericides, as aids in desizing operations and in the retting of flax, as aids to mercerizing lyes and for many other technical purposes.

The novel substances of my invention may be used in either acid, neutral or alkaline media.

Without limiting my invention to any particular process, the following example will serve to illustrate a preferred embodiment of my invention, parts by weight being given:

*Example*

210 parts of naphthylamine base and 420 parts of anhydrous sodium carbonate are added to 1500 parts of water and thoroughly stirred, whereupon 700 parts of dimethyl sulfate are gradually introduced. A vigorous reaction sets in, which is then brought to completion by boiling the mass for several hours. The upper layer which forms, and which contains about 650 parts of the crude base, is separated and treated first with 300 parts of a saturated sodium carbonate solution, and then with 100 parts of dimethyl-sulphate, to yield finally about 700 parts of a crude aqueous trimethyl-naphthyl-ammonium hydroxide. The latter is then vacuum dried over the water bath. 100 parts of the same are now condensed with 100 parts of isopropyl alcohol by means of 300 parts of concentrated sulphuric acid and at a temperature below 100° C. The resulting mass is drowned in 20,000 parts of water, converted into the free base with sodium hydroxide, separated from the undesirable, yellow, flocculent by-product by filtration, and evaporated while maintaining its alkalinity. As the concentration increases, a heavy, viscous oil separates in a mass amounting finally to 1.4 times the mass of the quaternary base used. This mass constitutes a propylated trimethyl-naphthyl-ammonium-hydroxide. It is water soluble, and possesses outstanding wetting, foaming, and emulsifying powers in alkaline, neutral, or acid baths.

By the term "nuclear condensing" as used in the claims, I mean a process of condensation in which the alkyl residue of an alcohol is substituted for hydrogen on one of the nuclear carbon atoms of the organic cyclic base.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing water soluble condensation products having capillaractive properties, which comprises nuclear condensing a carbo cyclic, water soluble, non-sulfonated quaternary ammonium compound with an aliphatic alcohol above ethyl alcohol in the paraffin series.

2. The process of preparing water soluble condensation products having capillaractive properties, which comprises nuclear condensing trialkyl-naphthyl-ammonium-alkyl-sulphate with isopropyl alcohol.

3. The process of preparing water soluble condensation products having capillaractive properties, which comprises nuclear condensing trimethyl-naphthyl-ammonium-methylsulphate with isopropyl alcohol in the presence of concentrated sulphuric acid at a temperature below 100° C.

4. As new products, water soluble condensation products having capillaractive properties which may be obtained by nuclear condensing a carbo cyclic, water soluble, non-sulfonated quaternary ammonium compound with an aliphatic alcohol above ethyl alcohol in the paraffin series.

5. As new products, water soluble condensation products having capillaractive properties which may be obtained by nuclear condensing trialkyl-naphthyl-ammonium-alkyl-sulphate with isopropyl alcohol.

6. As new products, water soluble condensation products having capillaractive properties which may be obtained by nuclear condensing trimethyl-naphthyl-ammonium-methyl-sulphate with isopropyl alcohol in the presence of concentrated sulphuric acid at a temperature below 100° C.

7. The process of preparing water soluble condensation products having capillaractive properties, which comprises nuclear condensing in the presence of concentrated sulfuric acid at a temperature below 100° C. an aromatic, water soluble, non-sulfonated quaternary ammonium compound with an aliphatic alcohol above ethyl alcohol in the paraffin series.

8. As new products, water soluble condensation products having capillaractive properties which may be obtained by nuclear condensing in the presence of concentrated sulfuric acid at a temperature below 100° C. an aromatic, water soluble, non-sulfonated quaternary ammonium compound with an aliphatic alcohol above ethyl alcohol in the paraffin series.

In testimony whereof I have hereunto subscribed my name at Dresden, Germany.

ROBERT MULLER.